United States Patent
Desai et al.

(10) Patent No.: US 9,348,771 B1
(45) Date of Patent: *May 24, 2016

(54) CLOUD-BASED INSTRUMENT DRIVER SYSTEM

(71) Applicant: The MathWorks, Inc., Natick, MA (US)

(72) Inventors: Ankit Desai, Framingham, MA (US); Robert K. Purser, Wayland, MA (US)

(73) Assignee: The MathWorks, Inc., Natick, MA (US)

( * ) Notice: Subject to any disclaimer, the term of this patent is extended or adjusted under 35 U.S.C. 154(b) by 3 days.

This patent is subject to a terminal disclaimer.

(21) Appl. No.: 14/180,807

(22) Filed: Feb. 14, 2014

Related U.S. Application Data

(63) Continuation of application No. 13/434,050, filed on Mar. 29, 2012, now Pat. No. 8,726,298.

(51) Int. Cl.
  *G06F 13/10* (2006.01)
  *G06F 9/44* (2006.01)

(52) U.S. Cl.
  CPC .............. *G06F 13/102* (2013.01); *G06F 9/4411* (2013.01)

(58) Field of Classification Search
  CPC .............................. G06F 9/4411; G06F 13/102
  See application file for complete search history.

(56) References Cited

U.S. PATENT DOCUMENTS

| | | | |
|---|---|---|---|
| 5,926,775 A | 7/1999 | Brumley et al. | |
| 5,963,726 A | 10/1999 | Rust et al. | |
| 6,681,284 B1 | 1/2004 | Thomson et al. | |
| 7,165,253 B1 | 1/2007 | Pike et al. | |
| 7,400,997 B2 | 7/2008 | Edson | |
| 7,502,031 B1 | 3/2009 | Pike et al. | |
| 7,716,382 B2 * | 5/2010 | Smith, IV | G06F 9/4413 710/15 |

(Continued)

OTHER PUBLICATIONS

"Instrument Control Toolbox: For Use with MATLAB®, User's Guide Version 2," The MathWorks, Inc., Mar. 2005, pp. i to xiv, 1-1 to 1-28, 2-1 to 2-8, 3-1 to 3-26, 4-1 to 4-38, 5-1 to 5-38, 6-1 to 6-34, 7-1 to 7-24, 8-1 to 8-16, 9-1 to 9-8, 10-1 to 10-16, 11-1 to 11-12, 12-1 to 12-18, 13-1 to 13-66, 14-1 to 14-28, 15-1 to 15-12, 16-1 to 16-170, 17-1 to 17-134, 18-1 to 18-18, A-1 to A-2, Index-1 to Index-16.

(Continued)

*Primary Examiner* — Charles E Anya
(74) *Attorney, Agent, or Firm* — Cesari and McKenna, LLP; Michael R. Reinemann

(57) ABSTRACT

A cloud-based instrument driver system enables a user device to interact with one or more instruments through a remotely located driver cloud. The driver cloud may store drivers and ancillary software. The user device may be connected to each instrument either directly or indirectly, for example, over one or more computer networks, and may be connected to and communicate directly with the driver cloud over the computer network. However, the driver cloud and the instrument may not be in direct communication. The user device relays commands and responses to and from the instrument to the driver cloud for translation into a format suitable for processing by the user device. Utilization of the driver cloud obviates the need to obtain, install and maintain any drivers and/or ancillary software on the user device in order to enable the device to interact with the instrument.

28 Claims, 7 Drawing Sheets

(56) References Cited

U.S. PATENT DOCUMENTS

| | | |
|---|---|---|
| 7,752,005 B2 | 7/2010 | Edson |
| 7,966,622 B1 | 6/2011 | Purser et al. |
| 2002/0184326 A1 | 12/2002 | Thomson |
| 2005/0198650 A1 | 9/2005 | Ford et al. |
| 2008/0028417 A1* | 1/2008 | Edson .................. G06F 9/4411 719/321 |
| 2010/0312930 A1 | 12/2010 | Yamagata et al. |
| 2012/0005264 A1 | 1/2012 | McWhirter et al. |
| 2012/0005584 A1* | 1/2012 | Seago ..................... G06F 11/32 715/738 |
| 2013/0145046 A1 | 6/2013 | Rivkin |

OTHER PUBLICATIONS

"Instrument Control Toolbox™ 2 : User's Guide," The MathWorks, Inc., Apr. 2011, pp. i to xx, 1-1 to 1-34, 2-1 to 2-10, 3-1 to 3-28, 4-1 to 4-40, 5-1 to 5-44, 6-1 to 6-38, 7-1 to 7-26, 8-1 to 8-16, 9-1 to 9-8, 10-1 to 10-24, 11-1 to 11-16, 12-1 to 12-14, 131 to 13-20, 14-1 to 14-68, 15-1 to 15-32, 16-1 to 16-28, 17-1 to 17-10, 18-1 to 18-158, 19-1 to 19-14, 20-1 to 20-142, 21-1 to 21-54, A-1 to A-8, B-1 to B-2, Index-1 to Index-14.

U.S. Appl. No. 13/434,050, filed Mar. 29, 2012 by Ankit Desai et al. For a Cloud-Based Instrument Driver System, pp. 1-38.

* cited by examiner

CLOUD-BASED INSTRUMENT DRIVER SYSTEM

CROSS-REFERENCE TO RELATED APPLICATIONS

This application is a continuation of application Ser. No. 13/434,050, filed Mar. 29, 2012 for a CLOUD-BASED INSTRUMENT DRIVER SYSTEM by Ankit Desai et al., now U.S. Pat. No. 8,726,298, which application is hereby incorporated by reference in its entirety.

BRIEF DESCRIPTION OF THE DRAWINGS

The invention description below refers to the accompanying drawings, of which.

DETAILED DESCRIPTION OF ILLUSTRATIVE EMBODIMENTS

Background

Figure 1:
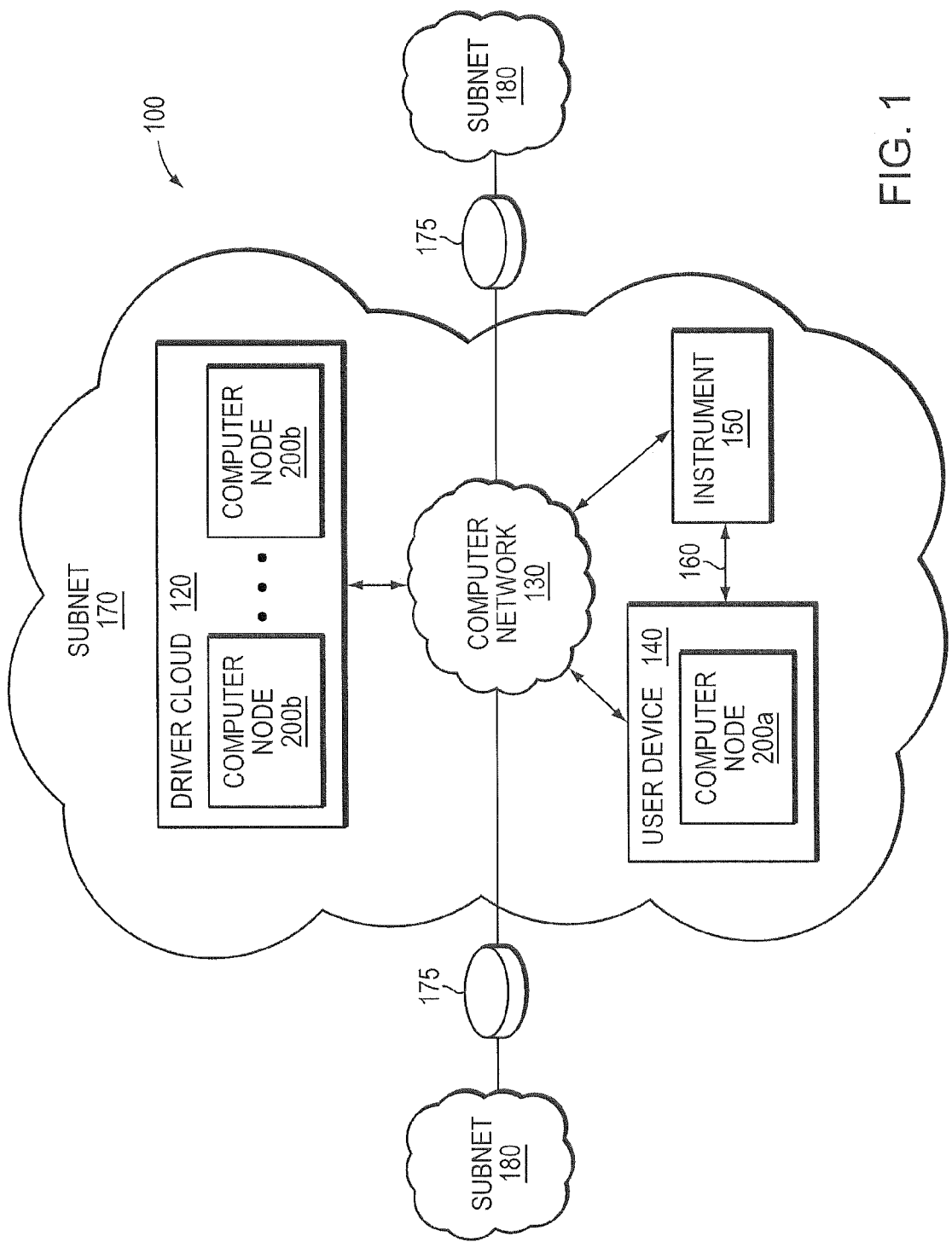
FIG. 1 is a schematic block diagram of a network environment that may be used with an embodiment of the invention.

Users, such as scientists, engineers, technicians and students, often employ user devices, such as laptop or desktop computers, to interact with and control operation of laboratory and other programmable instruments, such as oscilloscopes, signal (spectrum) analyzers, digital multimeters, and/or function generators. The user device may execute a high-level software (user) application, such as a data acquisition or test and measurement application, to acquire data from one or more instruments coupled to the user device and store that acquired data on the user device or present the data on a display screen of the device. Each instrument may be coupled to the user device through an interface, such as a Universal Serial Bus (USB) or serial port, an Ethernet card, or a General Purpose Interface Bus (GPIB) card.

In order to interact with the instrument, a set of software routines known as a driver may be loaded or installed on the user device. The driver translates high-level (user) commands, such as e.g., initialize, trigger, write and/or read that generally do not conform to a command protocol or syntax supported by the instrument, from the user application into a format understandable by the instrument, based on a command protocol or syntax supported by the instrument. The driver may also translate responses from the instrument into a format understandable by the application.

Often, there may be a number of different drivers available for use with an instrument. In addition, instrument manufacturers may periodically update the drivers for their instruments. Currently, the user must determine and obtain an appropriate driver to install for an instrument, as well as obtain and install any updates to that driver. Furthermore, many drivers may be dependent upon ancillary software including, e.g., shared software components, and/or interconnect layers, such as the Virtual Instrument Software Architecture (VISA), for proper interaction with the instrument. Accordingly, the user must also obtain and install appropriate versions of the ancillary software, and maintain them, i.e., keep them up-to-date. Installing software typically requires administrator access to the user device, which the user may not have. The need to identify, obtain, install and maintain an appropriate driver, as well as identify, obtain, install and maintain any necessary ancillary software, is a significant burden to many instrument users.

Overview

In an embodiment, a cloud-based instrument driver system enables a user device to interact with one or more instruments through a driver cloud remotely located from the user device and instruments. The driver cloud may include one or more computer nodes located on a computer network that stores drivers (from different vendors and for different instruments) and ancillary software (such as shared software components, and interconnect layers) for use by a user(s) and one or more user devices. The user device may be connected to each instrument either directly or indirectly, for example, over one or more wired or wireless computer networks. In addition, the user device may be connected to and communicate directly with the driver cloud over the computer network. However, the driver cloud and the instrument are not required to be in direct communication. The user device thus relays commands and responses to and from the instrument to the driver cloud for translation into a format suitable for processing by the user device. Utilization of the driver cloud obviates the need to obtain, install and maintain any drivers and/or ancillary software on the user device in order to enable the device to interact with the instrument.

Illustratively, each computer node of the driver cloud may execute software processes and/or modules embodied as one or more servers configured to store, select and invoke the drivers and ancillary software needed for the user device to interact with the instruments. To that end, the modules of the driver cloud may be embodied as a translation engine and a driver selection unit. The user device may be a computer node executing software processes and/or modules embodied as a driver cloud agent and a user application, such as a data acquisition application or a test and measurement application. In another embodiment, the software processes and/or modules of the user device may be embodied as a browser-based software application executing on a remote server.

To interact with an instrument, e.g., to acquire data or control the instrument, the user application may issue a user instruction or command that includes identification information specifying an identity of the instrument, such as manufacturer, model, and/or a Virtual Instrument Software Architecture (VISA) Instrument Descriptor (ID). The VISA specification is maintained by the IVI Foundation, and the current release is version 4.3, which is hereby incorporated by reference in its entirety. The driver cloud agent of the user device may intercept (receive) the command and forward it to the driver cloud within a first instrument-based request. The driver selection unit of the driver cloud analyzes the user command of the request to select an appropriate driver that enables the user device to interact with the instrument. For example, the driver selection unit may use the identification information of the command to access a data structure, such as a look-up table, to select the appropriate driver for interacting with the instrument. The driver selection unit may also utilize the data structure to determine and select the appropriate ancillary software, if any, that may be required for proper interaction with the instrument.

The driver selection unit may then provide the user command, along with an indication of the selected driver and ancillary software, to the translation engine. The translation engine invokes (i.e., calls upon) the selected driver and ancillary software to translate the user command of the instrument-based request into an instrument instruction or command having a format suitable for processing by the instrument. The translation engine may then forward the instrument command to the user device within a first cloud-based response. The driver cloud agent of the user device may intercept the instrument command of the response and forward it to the instrument, which executes the command.

Subsequently, the instrument may return a response to the user device. For example, if the command forwarded to the instrument is a request to read data, the instrument may return the requested read data in its response. The response from the instrument may be intercepted by the driver cloud agent, and forwarded to the driver cloud as a second instrument-based request. The driver selection unit may examine the instrument response and determine that the previously selected driver and ancillary software may be used to process the response. As a result, the driver selection unit provides the response to the translation engine, which invokes the driver and ancillary software to translate the instrument response into a user response having a format suitable for processing by the user application. The user response may then be forwarded to the user device within a second cloud-based response. The driver cloud agent of the user device may intercept the user response and pass the response to the user application for processing.

DETAILED DESCRIPTION

FIG. 1 is a schematic block diagram of a network environment 100 that may be used with an embodiment of the invention. The network environment 100 includes a first computer node 200a organized as a user device 140 coupled to one or more second computer nodes 200b organized as a driver cloud 120 over a computer network 130. The computer network 130 is illustratively a packet switched network having a plurality of network links and segments, including local area networks and/or wide area networks, organized as a subnetwork (subnet 170). The subnet 170 may be connected to one or more other subnets 180 by one or more intermediate nodes 175, such as routers, to form the network environment 100 of internetworked nodes. In an embodiment, a subnet may be bounded by a firewall. The nodes illustratively communicate by exchanging packets or messages according to a predefined set of protocols, such as the Transmission Control Protocol/Internet Protocol (TCP/IP), although it should be noted that other protocols, such as the HyperText Transfer Protocol (HTTP), may be used with the invention.

In an alternative embodiment, a circuit switching network, such as the Integrated Services Digital Network (ISDN), or other type of computer networking technology may be employed. For example, a network utilizing the Peripheral Component Interconnect Express (PCIe) expansion bus architecture, could also be utilized.

As described herein, the driver cloud 120 may be configured to store drivers (from different vendors and for different instruments) and ancillary software (such as shared software components, and interconnect layers) for use by the user device 140 when interacting with one or more instruments 150. The term instrument is intended to be construed broadly, and to include: test and measurement devices, such as oscilloscopes, signal (spectrum) analyzers, digital multimeters, and/or function generators, among others; data acquisition, generation and recorder devices; cameras; protocol interfaces, such as Controller Area Network (CAN) protocol interface cards, Serial Peripheral Interface (SPI) interface cards, Inter-Integrated Circuit (I²C) interface cards; etc. The user device 140, which may be under the operation of a user, such as a test engineer or scientist, or may be operating programmatically, may be connected to each instrument 150 either directly or indirectly, for example, over a bus 160 or over the computer network 130. In addition, the user device 140 may be connected to and communicate directly with the driver cloud 120 over the computer network 130. However, the driver cloud 120 and the instrument 150 may not be in direct communication. In this case, the user device 140 relays commands from the driver cloud 120 to the instrument 150. Utilization of the driver cloud 120 obviates the need to obtain, install and maintain any drivers and/or ancillary software on the user device 140 in order to enable the device to interact with the instrument 150.

Suitable bus architectures for the bus 160 include the General Purpose Interface Bus (GPIB), Peripheral Component Interconnect (PCI), Universal Serial Bus (USB), VME eXtension for Instrumentation (VXI), LAN eXtension for Instrumentation (LXI), Ethernet, and Infiniband. In addition, a wireless protocol, such as one or more of the IEEE 802.11 family of wireless protocols, may be used as a communication architecture.

Figure 2:
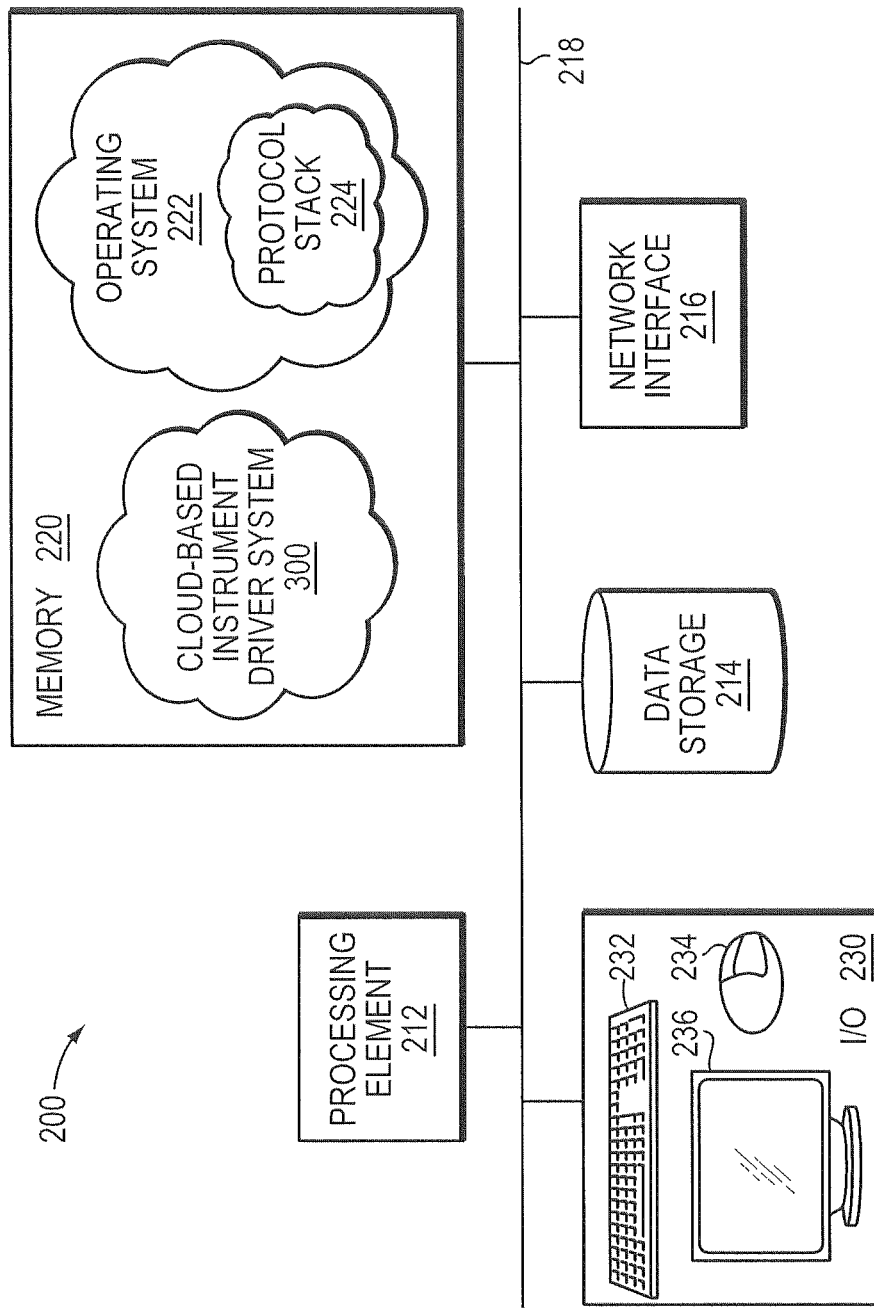
FIG. 2 is a schematic block diagram of a computer node that may be used with an embodiment of the invention.

FIG. 2 is a schematic block diagram of a computer node, e.g., a general-purpose computer, laptop or desktop computer, that may be used with an embodiment of the invention. The computer node 200a,b (hereinafter "computer node 200") illustratively comprises processing element 212, memory 220, user input/output (I/O) 230, data storage 214 such as, e.g., a disk drive, and one or more network interfaces 216 interconnected by a system bus 218. Each network interface 216 contains the mechanical, electrical and signaling circuitry needed to connect the node to the computer network 130 and/or bus 160 to thereby facilitate communication over the network or bus. To that end, the network interface 216 may be configured to transmit and/or receive messages using a variety of communication protocols including TCP/IP, HTTP, USB, GPIB, etc. The user I/O 230 may include a keyboard 232, a pointing device, such as a mouse 234, and/or a display screen 236.

The memory 220 may include a plurality of locations that are addressable by processing element 212, user I/O 230 and/or network interface 216 for storing software programs and data structures associated with the embodiments described herein. The processing element 212 may include logic adapted to execute the software programs and manipulate the data structures. Exemplary processing elements 212 include single or multi-core Central Processing Units (CPUs), Graphics Processing Units (GPUs), Field Programmable Gate Arrays (FPGAs) and/or Application Specific Integrated Circuits (ASICs).

An operating system 222, portions of which are typically resident in memory 220 and executed by the processing element, functionally organizes the node by, inter alia, invoking operations in support of software processes and/or applications executing on the node. The operating system 222 is illustratively organized as a series of software layers including, among others, a network media access layer and network protocol layers, e.g., an IP layer and its supporting transport mechanism TCP layer, organized as a network protocol stack 224. A suitable operating system 222 may include the Windows series of operating systems from Microsoft Corp. of Redmond, Wash., the Linux operating system, the MAC OS® series of operating systems from Apple Inc. of Cupertino, Calif., and the UNIX® series of operating system, among others. The software processes/applications executing on the node may include various processes/applications of a cloud-based instrument driver system 300 described herein.

It will be apparent to those skilled in the art that other types of processing elements and memory, including various computer-readable media, may be used to store and execute program instructions pertaining to the system described herein. Also, while the embodiments herein are described in terms of software processes/applications stored in memory, alternative embodiments also include those processes/applications being embodied as modules consisting of hardware, software, firmware, or combinations thereof.

As noted, the cloud-based instrument driver system 300 enables the user device 140 to interact with one or more instruments 150 through the driver cloud 120 remotely located from the user device and instruments. The driver cloud 120 may be remotely located relative to the user device 140 in a geospatial or physical (e.g., hardware-based) sense. For example, a user device and instrument may be located in a lab, while the driver cloud may be located in (or distributed among) another room, another building or another city. In other words, the driver cloud 120 may include (e.g., be running on) one or more nodes (e.g., hardware platforms), such as one or more servers located in one or more data centers, while the user device 140 may include (e.g., be running on) a different hardware platform, such as a laptop or other data processing device. In another embodiment, the driver cloud 120 may be remotely located relative to the user device 140 in a logical sense. For example, the driver cloud 120 and user device 140 may include (e.g., operate) in different virtual machines (VMs) that are nonetheless hosted on the same node(s). Each virtual machine may have its own instance of an operating system.

Figure 3:
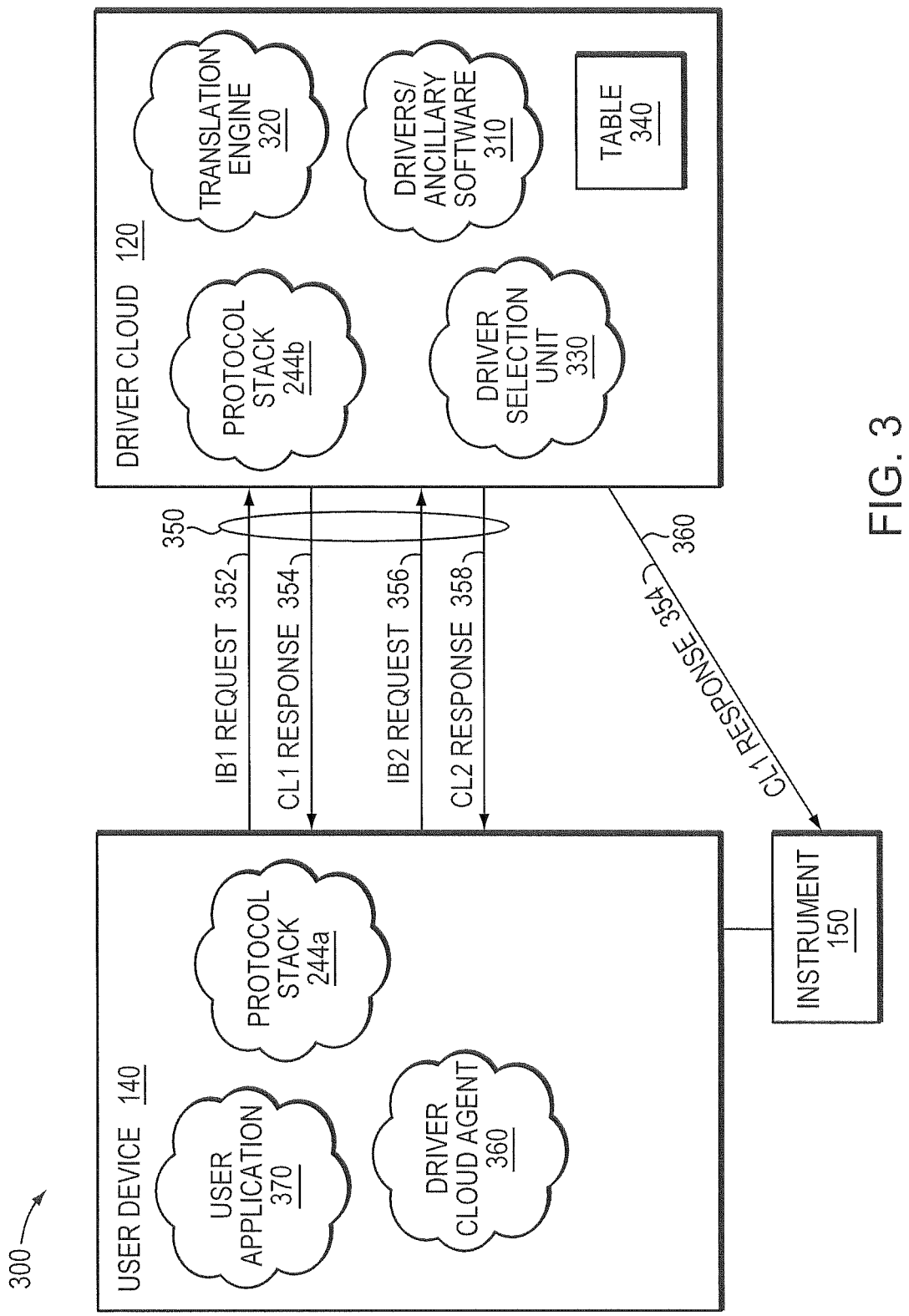
FIG. 3 is a schematic block diagram of an embodiment of a cloud-based instrument driver system that may be used with the invention.

FIG. 3 is a schematic block diagram of an embodiment of the cloud-based instrument driver system 300 that may be used with the invention. In this embodiment, the computer node 200 of the driver cloud 120 may execute software processes and/or modules embodied as one or more servers configured to store, select and invoke the drivers and ancillary software 310 needed for the user device 140 to interact with the instrument 150. To that end, the modules of the driver cloud may be embodied as a translation engine 320 and a driver selection unit 330. Furthermore, the computer node 200 of the user device 140 may execute software processes and/or modules embodied as a driver cloud agent 360 and a user application 370. In another embodiment, the computer node 200 of user device 140 may execute software processes and/or modules embodied as, e.g., a browser-based software application executing on a remote server.

In an embodiment, the modules of the cloud-based instrument system 300 may be implemented as separately-scheduled processes within each of the user device 140 and driver cloud 120; however, in an alternate embodiment, the modules may be implemented as pieces of code within a single process. Communication between modules of the user device 140 and between modules of the driver cloud 120 may thus illustratively be effected through the use of message passing or shared memory between the modules. Suitable message-passing or shared memory mechanisms provided by the operating system 222 to transfer information between modules (processes) are the Inter Process Communication (IPC) mechanism and the Remote Procedure Call (RPC) mechanism.

User application 370 contains computer executable instructions executed by processor 212 of computer node 200 to, e.g., acquire data and/or perform test and measurement functions. In an embodiment, a suitable user application 370 may include the MATLAB® and Simulink® technical computing applications from The MathWorks, Inc. of Natick, Mass., the Stateflow charting application and the Instrument Control Toolbox from The MathWorks, Inc., the LabVIEW programming application from National Instruments Corp. of Austin, Tex., the Visual Engineering Environment (VEE) application from Agilent Technologies, Inc. of Santa Clara, Calif., a Unified Modeling Language (UML) system, a Systems Modeling Language (SysML) system, the System Generator System from Xilinx, Inc. of San Jose, Calif., and the graphical modeling system described in U.S. Pat. No. 7,324,931 for Conversion of Model Components Into References, which is hereby incorporated by reference in its entirety. Those skilled in the art will understand that the MATLAB® technical computing application is a math-oriented, textual programming environment for digital signal processing (DSP) design, among other uses. The Simulink® technical computing application is a graphical, block-based environment for modeling and simulating dynamic systems, among other uses. A model may be a time-based, block diagram model that inherits data types, sample times, and data dimensions. The model may have dynamic typing, execution order inferencing, and may, for example through the MATLAB platform, support array-based analysis operations. Other modeling environments, such as the LabVIEW modeling system may support dataflow-based models.

Driver cloud agent 360 contains computer executable instructions executed by processor 212 of computer node 200 to perform functions configured to intercept commands and responses exchanged among the user device 140, driver cloud 120 and instrument 150, and forward those commands and responses to the appropriate module(s) for processing. Driver selection unit 330 contains computer executable instructions executed by the processor 212 of computer node 200 to perform functions configured to analyze the commands and responses exchanged among the user device 140, driver cloud 120 and instrument 150, and select appropriate drivers and ancillary software that enable the user device 140 to interact with the instrument 150. Translation engine 320 contains computer executable instructions executed by processor 212 of computer node 200 to perform functions configured to invoke the selected drivers and ancillary software to translate the commands and responses exchanged among the user device 140, driver cloud 120 and instrument 150 into respective commands and responses having formats suitable for processing by the instrument 150 and user application 370.

To interact with an instrument 150, e.g., to acquire data or control the instrument, the user application 370 executing on the user device 150 may evaluate a high-level, generic user instruction or command string that generally does not conform to a command syntax supported by the instrument 150 (i.e., a command that does not conform to the instrument protocol). In an embodiment, the command string can include identification information specifying an identity of the instrument, such as manufacturer, model, and/or a Virtual Instrumentation Software Architecture (VISA) Instrument Descriptor (ID). The driver cloud agent 360 may intercept (capture) the command string and forward it to network protocol stack 244a of the user device 140, which encapsulates the user command string within a first instrument-based (IB1) request 352.

The high-level, generic user instruction or command string may be created or generated by the user device 150 in response to user input or programmatically. For example, a user may enter an instruction or command at a Human Machine Interface (HMI), such as a Graphical User Interface (GUI) and/or a Command Line Interface (CLI), which may be provided by the user application 370. In addition, the instruction or command string may be generated in response to textual, graphical or a combination of textual and graphical inputs. For example, the user may enter, for example with the keyboard, a textual string that conforms to the syntax of the user application 370. In another embodiment, the user may construct a graphical program having a plurality of graphical objects, such as icons or blocks. One or more icons or blocks may generate the user instruction or command string, for example during execution of the graphical model.

In an embodiment, the user device 140 may be configured to communicate with the driver cloud 120 in accordance with a request/response protocol that enables the user device to connect (i.e., via a connection 350) with the driver cloud to utilize the drivers/ancillary software 310 needed to interact with instrument 150. The protocol stacks 244a,b may then cooperate to establish the connection 350 between the user device and the driver cloud 120, and enable transmission of the IB1 request 352 to the driver cloud over the connection. Illustratively, the connection 350 is provided by a process of a transport layer, such as the TCP layer, of protocol stacks 244a,b executing on the user device 140 and driver cloud 120. The TCP layer processes establish the connection in accordance with a conventional "3-way handshake" arrangement involving the exchange of TCP message or segment data structures. The resulting connection 350 is a reliable, securable logical circuit that is generally identified by port numbers and IP addresses of the user device and driver cloud.

Upon receiving the IB1 request 352, protocol stack 244b of the driver cloud 120 recovers and passes the command string from the request to one or more of the driver selection unit 330 and translation engine 320. Illustratively, the driver selection unit 330 and translation engine 320 may include software layers configured as VISA and Interchangeable Virtual Instrument (IVI) modules. Broadly stated, the VISA module provides a "middleware" interface supported by the IVI architecture to enable bus and platform independent instrument communication through an application programming interface (API) that allows the user application to issue generic commands over an interconnect to the instrument. That is, the IVI architecture may be embodied as an IVI module configured to provide an implementation of the driver needed to interact with the instrument and, thus, translate the generic command to a command that conforms to the instrument protocol. The VISA module may then provide an implementation of the transport protocol needed to deliver that command to the instrument over an interconnect, such as computer network 130 or bus 160. To that end, the VISA API provides a defined VISA ID string that indicates an interconnect type (such as USB, GPIB or Ethernet, i.e., TCP/IP), an address (logical or primary) of the instrument and a VISA session type (such as INSTR). Examples of VISA ID string formats that may be used to identify and access instruments include:

TCPIP0::192.168.1.1::instr0
GPIB0::23::instr

The first string specifies an interconnect type of TCP/IP, an IP address of "192.168.1.1", and a session type or VISA class of "instr", which is the most general class encompassing all VISA operations. The zero appearing in the interconnect type is used to distinguish among multiple TCP/IP sessions.

The second string specifies a GPIB interconnect type, a GPIB address of "23", and a session type or VISA of "instr". Again, the zero appearing in the interconnect type is used to distinguish among multiple GPIB devices.

In an embodiment, the driver selection unit 330 analyzes and parses the user command (including the VISA ID) string to select an appropriate driver, e.g., the IVI driver, that enables the user device to interact with the instrument 150. For example, the driver selection unit 330 may use the identification information of the command string to access a data structure, such as a look-up table 340, to select the appropriate driver for interacting with the instrument. The driver selection unit 330 may also utilize the look-up table 340 to determine and select the appropriate ancillary software, e.g., the VISA module, that may be required for proper interaction with the instrument. The driver cloud 120 may include a driver store (e.g., configured as designated locations of memory 220 and/or data storage 214) for storing the plurality of drivers and ancillary software for selection by the driver selection unit 330.

A suitable driver selection strategy is described in U.S. Pat. No. 7,966,622 for Interfacing a Device Driver with an Application Using a Virtual Driver Interface and a Strategy, which is hereby incorporated by reference in its entirety.

The driver selection unit 330 may then provide the user command, along with an indication of the selected driver and ancillary software 310, to the translation engine 320. The translation engine 320 invokes (i.e., calls upon) the selected driver and ancillary software 310 to translate the user command of the IB1 request 352 into an instrument instruction or command having a format suitable for delivery to and processing by the instrument 150 (i.e., a low-level command suitable for direct execution by the instrument that conforms to the command syntax, transport protocol and instrument protocol of the instrument 150). The translation engine 320 may then pass the instrument command to the driver cloud protocol stack 244b, which encapsulates the command within a first cloud-based (CL1) response 354, and transmits the response to the user device 140 over the established connection 350. The user device protocol stack 244a may receive and recover the instrument command from the CL1 response 354. The driver cloud agent 360 may intercept the instrument command, and forward it to the instrument 150, which executes (processes) the command.

Subsequently, the instrument 150 may return an instrument response to the user device 140. For example, if the command forwarded to the instrument is a request to read data, the instrument may return the requested read data in its response. The response from the instrument may be intercepted by the driver cloud agent 360 and passed to the protocol stack 244a, which encapsulates the instrument response (data) within a second instrument-based (IB2) request 356. The protocol stack 244a may then transmit the IB2 request 356 to the driver cloud 120 over the established connection 350. Thereafter, the protocol stack 244b of the driver cloud 120 receives the IB2 request 356, and recovers and passes the instrument response to the driver selection unit 330. The driver selection unit 330 may examine the instrument response and determine that the previously selected driver and ancillary software 310 may be used to process the response. As a result, the driver selection unit 330 provides the instrument response to the translation engine 320, which invokes the driver and ancillary software 310 to translate the response into a user response having a format suitable for processing by the user application 370. The user response may then be encapsulated into a second cloud-based (CL2) response 358 and transmitted to the user device 140 over the connection 350. The protocol stack 244a of the user device 140 may receive and recover the user response from the CL2 response 358. The driver cloud agent 360 may intercept the user response and pass it to the user application 370 for processing.

In an embodiment, the driver cloud 120 may store state information for a particular session with an instrument 150 and/or a user device 140. The state information may be stored at a cache located at the driver cloud 120. This state information may include instrument state information, such as the setting of one or more instrument values. Maintaining state information may improve system performance by eliminating one or more redundant messages, such as messages that reset an instrument that has already been set. The state information may be deleted from the cache following the session with the instrument 150 and/or the user device 140.

In an embodiment, the driver cloud 120 may communicate directly with the instrument 150. For example, if the instrument 150 is directly connected to the driver cloud 120 or is located in the same subnet 170 as the driver cloud, the translation engine 320 may pass the translated command to the driver cloud protocol stack 244b, which encapsulates the command within the CL1 response 354 and establishes a connection 360, e.g., a TCP connection, with the instrument 150. The protocol stack 244b then transmits the response 354 directly to the instrument 150, rather than to the user device 140.

Figure 4:
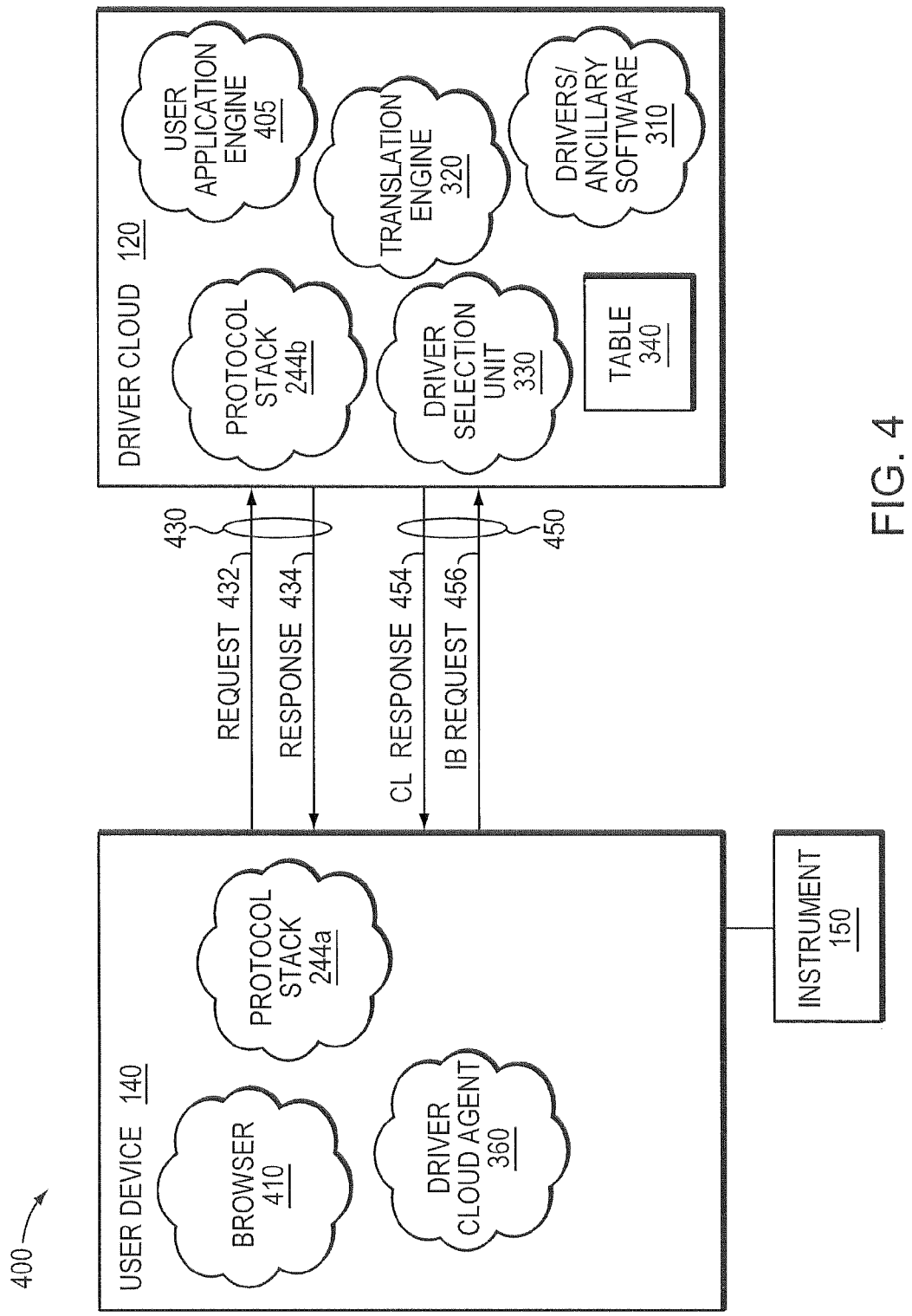
FIG. 4 is a schematic block diagram of an alternate embodiment of the cloud-based instrument driver system that may be used with the invention.

FIG. 4 is a schematic block diagram of an alternate embodiment 400 of the cloud-based instrument driver system that may be used with the present invention. Computer node 200 of driver cloud 120 may execute software processes and/or modules embodied as one or more servers configured to store, select and invoke driver and ancillary software 310 needed for user device 140 to interact with instrument 150. To that end, the modules of the driver cloud may be embodied as translation engine 320 and driver selection unit 330. Furthermore, the computer node 200 of user device 140 may execute one or more software processes and/or modules embodied as driver cloud agent 360 to intercept commands and responses exchanged among the user device 140, driver cloud 120 and instrument 150, and forward those commands and responses to the appropriate module(s) for processing. However, in this embodiment, a user application engine 405 may execute on the computer node 200 of the driver cloud 120, and a browser application 410 may execute on the computer node 200 of the user device 140.

The user application engine 405 may have similar functionality as user application 370, but unlike user application 370, the user application engine 405 may not include a front-end, e.g., a Human Machine Interface (HMI).

The browser application 410 is illustratively a browser-based remote access application that enables a user of user device 140 to issue requests to user application engine 405 on the driver cloud 120. The browser application 410 may be configured to communicate with the user application engine 405 in accordance with a protocol, e.g., HTTP, that enables the user device to connect (i.e., via a connection 430) with the driver cloud to utilize the driver and ancillary software 310 needed to interact with instrument 150. Protocol stacks 244a,b may cooperate to establish the connection 430 with the driver cloud 120 and enable transmission of request 432 to the driver cloud over the connection. Illustratively, the connection 430 is an HTTP(S) connection provided by a process of an HTTP layer of protocol stacks 244a,b executing on the user device 140 and driver cloud 120.

Operationally, the user of the browser application 410 may input I/O (e.g., keyboard 232) activity, such as user commands, which are forwarded to the user application engine 405 as request 432. The user application engine 405 may then implement those commands on the driver cloud 120. For example, the user application engine 405 may issue the user commands to the driver selection unit 330 and translation engine 320. Illustratively, the driver selection unit 330 and translation engine 320 may include software layers configured as VISA and IVI modules. The IVI module may be configured to provide an implementation of the driver needed to interact with the instrument and, thus, translate a generic user command to a command that conforms to the instrument protocol. However, in addition to providing an implementation of the transport protocol needed to deliver the instrument command to the instrument over an interconnect, such as computer network 130 or bus 160, the VISA module may be further configured to redirect the translated instrument command (having a format suitable for delivery to and processing by the instrument 150, i.e., a command that conforms to the transport protocol and instrument protocol of the instrument 150) to the user device.

Accordingly, the instrument command is redirected to the driver cloud protocol stack 244b, which encapsulates the command within a CL response 454 and transmits the response to the user device 140 over a connection 450, e.g., a TCP connection. The user device protocol stack 244a may receive and recover the instrument command from the CL response 454. The driver cloud agent 360 may intercept the instrument command and forward it to the instrument 150, which executes (processes) the command. Subsequently, the instrument 150 may return an instrument response to the user device 140, which is intercepted by the driver cloud agent 360 and passed to the protocol stack 244a for encapsulation within an IB request 456. The protocol stack 244a may then transmit the IB request 456 to the protocol stack 244b of driver cloud 120 over the established connection 450. The instrument response is then passed to the driver selection unit 330, which may determine that the previously selected driver and ancillary software 310 may be used to process the response. As a result, the driver selection unit 330 provides the instrument response to the translation engine 320, which invokes the driver and ancillary software 310 to translate the response into a user response having a format suitable for processing by the user application engine 405. The user response is then passed to user application engine 405 for processing. The result of the processing is forwarded to protocol stack 244b for transmission as response 434 to the browser application 410 of user device 140 over connection 430. The browser application 410 may thereafter output the response via, e.g., display screen 236 for viewing by the user.

Suitable browsers include the Internet Explorer browser from Microsoft Corp., the Firefox browser from the Mozilla Foundation, and the Chrome browser from Google, Inc., among others. Suitable remote communication systems include the Remote Desktop Connection tool from Microsoft Corp., among others. Suitable user application engines include the MATLAB on the Web product from The MathWorks, Inc.

It should be understood that other configurations and arrangements may be used. For example, instead of the browser 410, a client-side application may communication, e.g., through TCP/IP and/or web services, to the user application engine 405. In another example, different instances of the same application or module, such as the MATLAB on the Web product, may be running on the user device 140 and on the driver cloud 120, and may communicate with each other.

The cloud-based instrument driver system 300 described herein obviates the need for a user to obtain and install any drivers and/or ancillary software on user device 140 in order to enable the device to interact with instrument 150. In an embodiment, the user device 140 may be free of storing or having any instrument drivers or ancillary software stored thereon. Although previous systems may enable downloading of a driver from a driver server to a user device over, e.g., a computer network, the downloaded driver must still be installed and maintained (kept up-to-date) locally on the user device. Utilization of driver cloud 120 of the cloud-based instrument driver system 300 to store, select and invoke the drivers and ancillary software 310 needed for the user device to interact with instrument 150 eliminates the burden on the user to identify, obtain, install and maintain appropriate drivers and ancillary software on the user device.

The driver cloud 120 may include an update unit that is programmed to periodically, for example according to a predefined schedule, determine whether any updates have been released for the drivers/ancillary software 310 stored at the driver cloud 120. The update unit may access one or more instrument manufacturer websites to obtain the updates.

In an embodiment, the user application 370 may query the driver cloud 120 to obtain a list of instruments that are available to the user device 140. In response to such a query, the driver cloud may issue a discovery request to identify all instruments connected to the subnet. The driver cloud may provide this list to the user application 370, and the user application may then interact with a selected instrument.

The LXI standard, which is promulgated by the LXI Consortium, for example, defines a mechanism for discovering LXI-compliant instruments on a LAN or subnet. The driver cloud 120 may direct the driver cloud agent 360 at the user device 140 to run an instrument discovery query per the LXI standard. The results of this query may be provided to the driver cloud 120, which may translate the results into a format suitable for the user application 370. The driver cloud 120 may send the translated results to the user device 140 for review by the user application 370.

In another embodiment, the driver cloud agent 360 may intercept a query to discover available instruments issued by the user application 370, and send the query to the driver cloud 120. The driver cloud 120 may convert the query to be LXI-compliant, and return it to the user device 140, and the driver cloud agent 360 or user application 370 may broadcast or multicast the LXI-compliant discovery message on one or more LANs or subnets to which the user device 140 is connected. Responses to the LXI-compliant discovery message may be captured by the driver cloud agent 360, and sent to the driver cloud 120. The driver cloud 120 may convert the responses into a format recognizable by the user application 370, and may send the converted responses to the user device 140. The driver cloud agent 360 may receive the converted responses, and pass them to the user application 370, thereby notifying the user application 140 of one or more available instruments.

Other auto-discovery techniques may also be supported by the driver cloud agent 360 and the driver cloud 120. Other such techniques include PXI enumeration based on PCI or PCIe, USB device discovery, GPIB device enumeration, and VXI-11 discovery protocols.

Figure 5A:
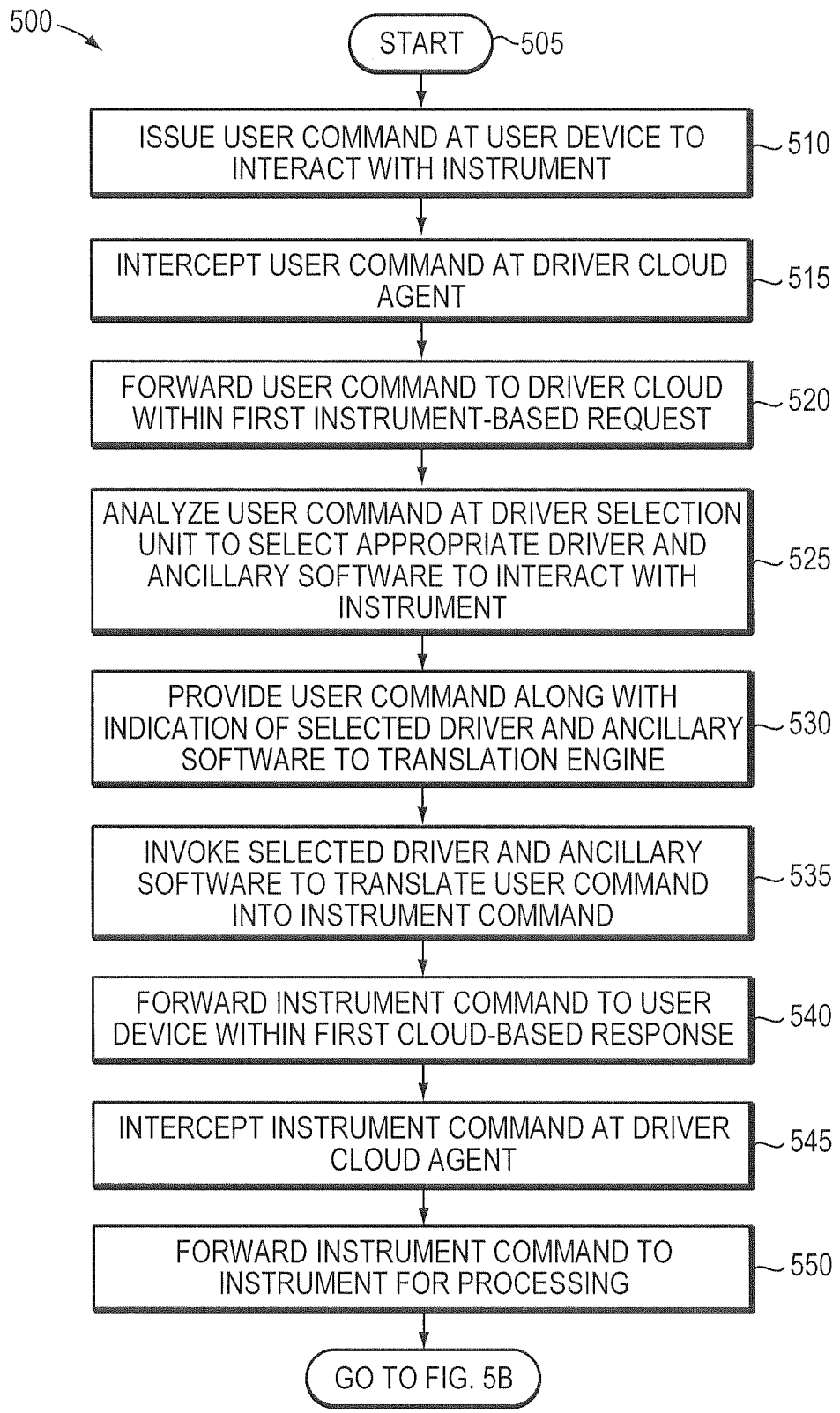
FIGS. 5A-B are flow diagrams of an example simplified procedure for enabling a user device to interact with one or more instruments through a driver cloud remotely located from the user device and instruments in accordance with an embodiment of the invention.
Figure 5B:
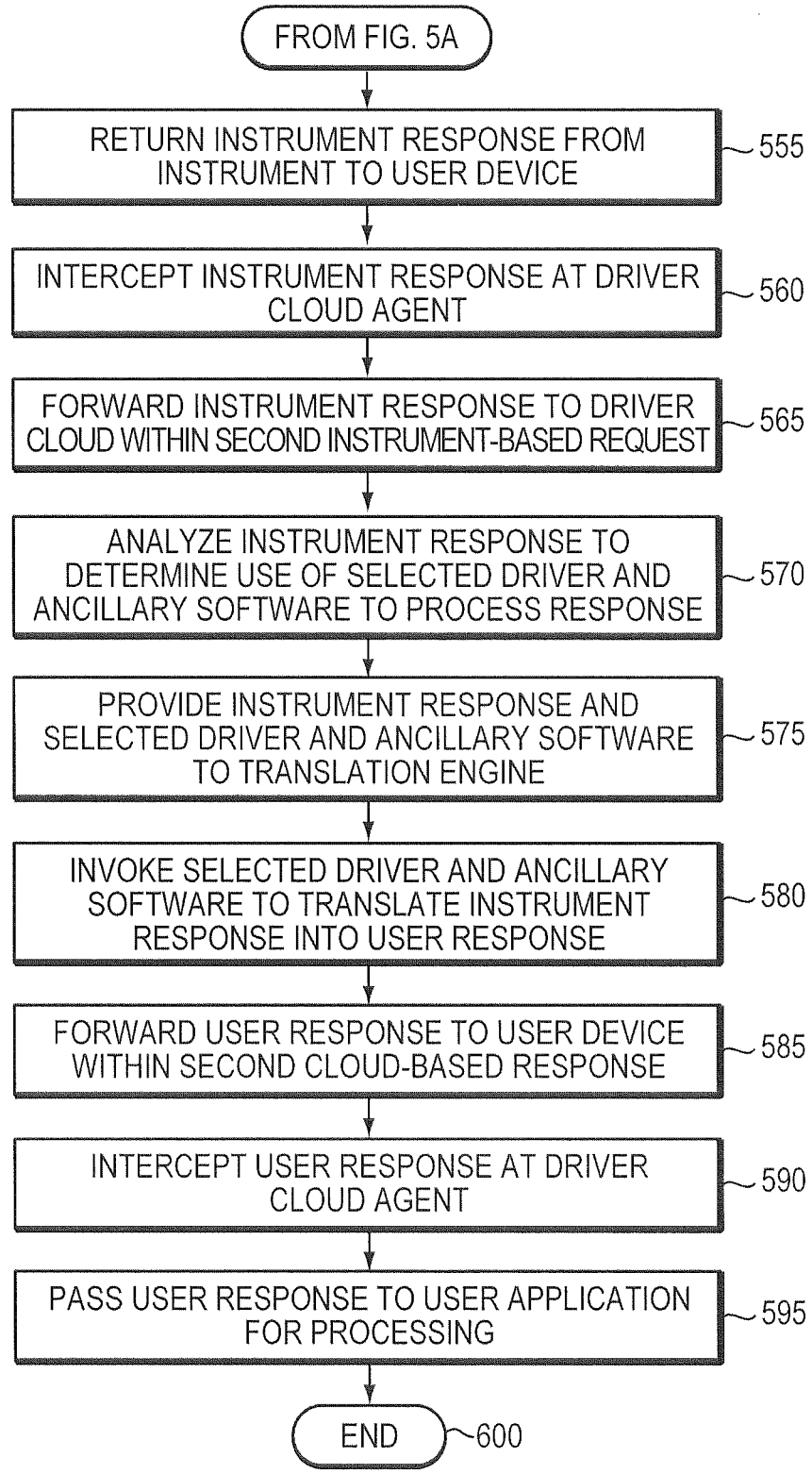

FIGS. 5A-B are flow diagrams of an example procedure for enabling a user device to interact with one or more instruments through a driver cloud remotely located from the user device and instruments in accordance with an embodiment of the present invention. The procedure 500 starts at block 505 and continues to block 510 where user application 370 executing on user device 140 may issue a user command to interact with instrument 150, e.g., to acquire data or control the instrument. In an embodiment, the user command may include identification information specifying an identity of the instrument, such as manufacturer, model, and/or a VISA ID. At block 515, driver cloud agent 360 executing on user device 140 may intercept the command and, at block 520, forward the command to the driver cloud 120 within a first instrument-based request. At block 525, driver selection unit 330 of the driver cloud 120 may analyze the user command of the request to select appropriate driver and ancillary software 310 that enables the user device to interact with the instrument.

At block 530, driver selection unit 330 may then provide the user command, along with an indication of the selected driver and ancillary software 310, to translation engine 320. At block 535, translation engine 320 may invoke the selected driver and ancillary software 310 to translate the user command of the instrument-based request into an instrument command having a format suitable for processing by the instrument. At block 540, translation engine 320 may then forward the instrument command to the user device within a first cloud-based response. At block 545, driver cloud agent 360 of the user device 140 may intercept the instrument command of the response and, at block 550, forward the command to the instrument 150 for processing.

At block 555, the instrument 150 may return an instrument response to the user device 140. At block 560, the response from the instrument 150 may be intercepted by the driver cloud agent 360 and, at block 565, forwarded to the driver cloud 120 as a second instrument-based request. At block 570, the driver selection unit 330 of the driver cloud 120 may analyze the instrument response to determine that the previously selected driver and ancillary software 310 may be used to process the response. At block 575, driver selection unit 330 provides the instrument response and selected driver and ancillary software to translation engine 320 which, at block 580, invokes the driver and ancillary software 310 to translate the instrument response into a user response having a format suitable for processing by the user application. At block 585, the user response may then be forwarded to the user device 140 within a second cloud-based response. At block 590, driver cloud agent 360 of the user device 140 may intercept the user response and, at block 595, pass the user response to the user application 370 for processing. The procedure then ends at block 600.

Figure 6:
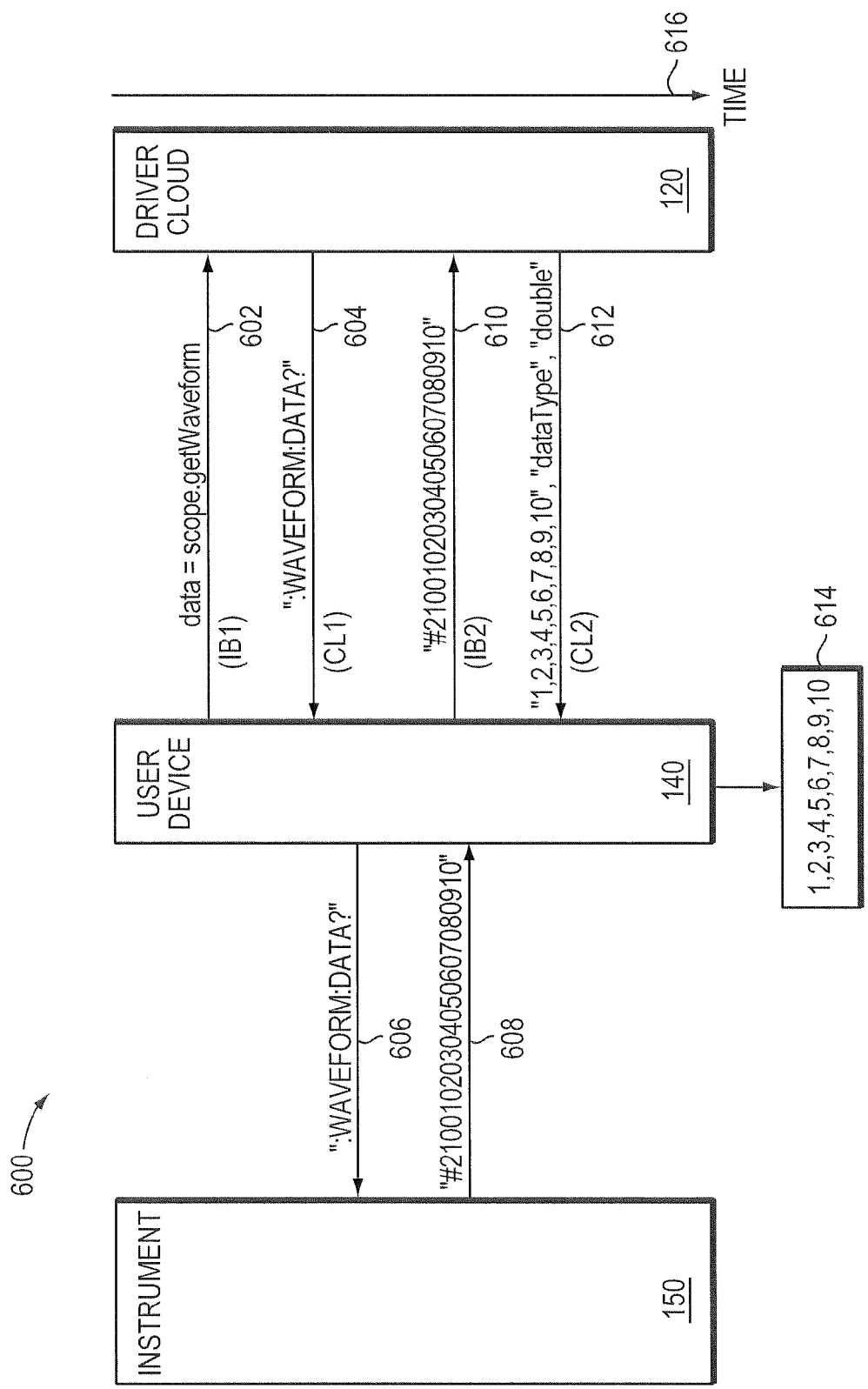
FIG. 6 is a schematic message diagram in accordance with an embodiment of the invention.

As an example, suppose a user wants to obtain waveform data from an oscilloscope. FIG. 6 is a schematic illustration of a message diagram 600 that illustrates exemplary messaging that may be involved in such a request. The message diagram 600 includes the instrument 150, the user device 140, and the driver cloud 120. A user, operating the user application 370 (FIG. 3) at the user device 140, may enter a command string in a format compatible with the user application 370. For example, the user may enter the following command string:

data=scope.getWaveform

According to the syntax and semantics of the user application 370, an output variable name, e.g., 'data', may be specified on the left of the equal sign for holding output data generated during execution of a function specified on the right of the equal sign, i.e., 'scope.getWaveform'. The first portion of the function, i.e., 'scope', may specify the particular instrument, e.g., an oscilloscope. The second portion of the function, i.e., 'getWaveform', may specify the operation to be performed by the instrument, e.g., obtain waveform data. The driver cloud agent 360 (FIG. 3) at the user device 140 may intercept this command string, and forward it to the network protocol stack, which may encapsulate the command string within one or more messages of a first instrument-based (IB1) request, as illustrated by first arrow 602. At the driver cloud 120, the translation engine 320 may invoke the selected driver and ancillary software to translate the user command of the IB1 request (arrow 604) into an instruction or command having a format suitable for delivery to and processing by the instrument 150, i.e., the oscilloscope. An exemplary translated instruction or command may be the following:

"WAVEFORM:DATA?"

The translation engine 320 may then pass this instrument command to the driver cloud protocol stack, which may encapsulate the command within one or more messages of a first cloud-based (CL1) response, and transmits the one or more messages to the user device 140, as indicated by second arrow 604. The driver cloud agent 360 at the user device 140 may intercept the instrument command, and forward it to the instrument 150, as indicated by third arrow 606. The instrument 150 may execute the command, generating response data. The response data may be in a format specified by the instrument, but understandable by the instrument driver. The following represents exemplary response data generated by the instrument 150:

"#2100102030405060708091 0"

The instrument 150 may return this response data to the user device 140, as indicated by fourth arrow 608. The response from the instrument 150, which is not understandable by the user application 370, may be intercepted by the driver cloud agent 360 at the user device 140, which may encapsulate the response in one or more messages, and transmit the one or more messages as a second instrument-based (IB2) request to the driver cloud 120, as indicated by fifth arrow 610. The driver selection unit 330 at the driver cloud 120 may examine the instrument response, and determine that the previously selected driver and ancillary software 310 may be used to process the response. The driver selection unit 330 may provide the instrument response to the translation engine 320 at the driver cloud 120, which may invoke the driver and ancillary software 310 to translate the response into a user response having a format suitable for processing by the user application 370. An exemplary format of the response as translated for the user application 370 may be the following:

"1, 2, 3, 4, 5, 6, 7, 8, 9, 10", "dataType", "double"

According to the syntax and semantics of the user application 370, the first portion of the response, i.e., "1, 2, 3, 4, 5, 6, 7, 8, 9, 10", may specify the data generated by the instrument 150. The second portion, i.e., "dataType", may specify a category of an attribute of the data. The third portion, i.e., "double", may specify a value for that attribute. In this case, the attribute is data type and the value is double precision. The user response may then be encapsulated into one or more messages of a second cloud-based (CL2) response, and transmitted to the user device 140, as indicated by sixth arrow 612. The driver cloud agent 360 at the user device 140 may intercept the response, and pass it to the user application 370 for processing. For example, the user application 370 may present the data contained in the response on a display, such as display 614, that is connected to (or part of) of the user device 140.

A time arrow 616 provides an indication of the passage of time.

It should be understood that the command strings, instructions, and data formats described herein are meant for illustrative purposes only, and that many other formats or command syntaxes may be used. Furthermore, the user command alternatively may be entered programmatically.

In addition, in another embodiment, the translated command (CL1) may be sent directly to the instrument 150 from the driver cloud 120, and the response data generated by the instrument 150 (arrow) may be sent directly to the driver cloud 120, among other arrangements.

While there have been shown and described illustrative embodiments that enable a user device to interact with one or more instruments through a driver cloud remotely located from the user device and instruments in accordance with a cloud-based instrument driver system, it is to be understood that various other adaptations and modifications may be made within the spirit and scope of the embodiments herein. For example, the embodiments have been shown and described herein with relation to, e.g., generic commands/requests exchanged among the user device 140, driver cloud 120 and instruments 150 that are predefined for each instrument 150. However, the embodiments in their broader sense are not so limited, and may, in fact, be used with vendor-specific commands/requests that vendors can define which are unique to their instruments (and which may enable unique functions to be performed on their instruments). The cloud-based instrument driver system 300 described herein may thus be extended to allow the user device 140 (i.e., a user or user application 370) to request an inventory of all commands/requests (both generic and vendor-specific) for an instrument. In response to such an inventory request, the driver cloud 120 may return a response indicating a particular format with which to use to issue such commands/requests to the driver cloud 120. The user does not have to configure the user device with any driver and/or ancillary software 310, but rather can just communicate with the instrument 150 via the driver cloud 120.

The foregoing description of embodiments is intended to provide illustration and description, but is not intended to be exhaustive or to limit the invention to the precise form disclosed. Modifications and variations are possible in light of the above teachings or may be acquired from a practice of the invention. For example, while a series of acts has been described above with respect to the flow diagrams, the order of the acts may be modified in other implementations. Further, non-dependent acts may be performed in parallel.

Further, certain embodiments of the invention may be implemented as logic that performs one or more functions. This logic may be hardware-based, software-based, or a combination of hardware-based and software-based. Some or all of the logic may be stored in one or more tangible non-transitory computer-readable storage media and may include computer-executable instructions that may be executed by a computer or data processing system, such as driver cloud 120 and/or user device 140. The computer-executable instructions may include instructions that implement one or more embodiments of the invention. The tangible non-transitory computer-readable storage media may be volatile or non-volatile and may include, for example, flash memories, dynamic memories, removable disks, and non-removable disks.

No element, act, or instruction used herein should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

The foregoing description has been directed to specific embodiments of the present invention. It will be apparent, however, that other variations and modifications may be made to the described embodiments, with the attainment of some or all of their advantages. For example, in addition to VISA, another known middle-wear interface that may be advantageously used with the cloud-based instrument driver system described herein is a Peripheral Component Interconnect (PCI) eXtensions for Instrumentation (PXI) memory-based solution that utilizes bus addresses. Instead of exchanging VISA ID type strings among the software processes and/or modules of the cloud-based instrument driver system 300, the PXI-based interface solution exchanges memory addresses and data values (i.e., setting memory addresses in instrument 150 interacting with user device 140). Therefore, it is the object of the appended claims to cover all such variations and modifications as come within the true spirit and scope of the invention.

What is claimed is:

1. One or more non-transitory computer-readable media comprising instructions, the instructions when executed by one or more processing elements configured to:
   store, at a driver cloud that is located remotely from a user device, a plurality of instrument drivers for an instrument that responds to instrument commands that conform to an instrument protocol;
   receive, at the driver cloud from the user device, a first command directed to the instrument, the first command:
   evaluated by an application program, and
   not conforming to the instrument protocol;
   select, by the driver cloud, a particular instrument driver from among the plurality of instrument drivers for the instrument, where the particular instrument driver that is selected supports interaction with the instrument;
   translate, at the driver cloud, using the particular instrument driver, the first command into one or more of the instrument commands, where the one or more of the instrument commands conform to the instrument protocol;
   receive, at the driver cloud, a response following execution of the one or more of the instrument commands at the instrument;
   following receipt of the response, determine, at the driver cloud, that the response is syntactically correct for the particular instrument driver that is to process the response;
   process, at the driver cloud, the response utilizing the particular instrument driver to produce a user response; and
   transmit, from the driver cloud to the user device, the user response.

2. The one or more non-transitory computer-readable media of claim 1 further comprising instructions executable by the one or more processing elements to:
   maintain, at the driver cloud, state information for a session with the instrument.

3. The one or more non-transitory computer-readable media of claim 1 wherein the instrument is connected to or simulated at the user device.

4. The one or more non-transitory computer-readable media of claim 1 further comprising instructions executable by the one or more processing elements to:
   translate, using the particular instrument driver, the first response into the user response that is compatible with the application program.

5. The one or more non-transitory computer readable media of claim 1 wherein the application program is selected from the group consisting of: a graphical modeling program, an array-based analysis program, and a browser.

6. The one or more non-transitory computer readable media of claim 5 wherein the graphical program is a dataflow program or a time-based simulation program.

7. The one or more non-transitory computer readable media of claim 1 wherein the instrument is a computer-controlled, data acquisition device.

8. The one or more non-transitory computer readable media of claim 7 wherein the computer-controlled, data acquisition device is a digital multimeter, a function generator, or an oscilloscope.

9. The one or more non-transitory computer readable media of claim 1 wherein the user device is free from including a driver for the instrument.

10. The one or more non-transitory computer readable media of claim 1 further comprising instructions executable by the one or more processing elements to:
    store, at the driver cloud, a plurality of ancillary software modules;
    select, by the driver cloud, from among the plurality of ancillary software modules, a particular ancillary software module for the instrument; and
    use the particular ancillary software module with the particular instrument driver to translate the first command into the one or more of the instrument commands.

11. The one or more non-transitory computer readable media of claim 10 wherein the particular ancillary software is one or more shared software components or a Virtual Instrument Software Architecture (VISA) interconnect layer.

12. One or more non-transitory computer-readable media comprising instructions, the instructions when executed by one or more processing elements configured to:
    store, at a driver cloud that is located remotely from a user device, a plurality of instrument drivers for an instrument that responds to instrument commands that conform to an instrument protocol and a user application program;
    receive, at the driver cloud from a browser application running at the user device, a designation of a first command directed to the instrument, the first command:
    designated by the browser application running at the user device, evaluated by the user application program at the driver cloud, and not conforming to the instrument protocol;
    select, by the driver cloud, a particular instrument driver from among the plurality of instrument drivers for the instrument, where the particular instrument driver that is selected supports interaction with the instrument according to the instrument protocol;
    translate, at the driver cloud, using the particular instrument driver, the first command into one or more of the instrument commands, where the one or more of the instrument commands conform to the instrument protocol;
    receive, at the driver cloud, a response following execution of the one or more of the instrument commands at the instrument;
    following receipt of the response, determine, at the driver cloud, that the response is syntactically correct for the particular instrument driver that is to process the response;
    process, at the driver cloud, the response utilizing the particular instrument driver to produce a user response; and
    transmit, from the driver cloud to the user device, the user response.

13. The one or more non-transitory computer-readable media of claim 12 further comprising instructions executable by the one or more processing elements to:
    maintain, at the driver cloud, state information for a session with the instrument.

14. The one or more non-transitory computer-readable media of claim 12 wherein the instrument is connected to or simulated at the user device.

15. The one or more non-transitory computer-readable media of claim 12 further comprising instructions executable by the one or more processing elements to:

translate, using the particular instrument driver, the response into the user response that is compatible with the application program.

16. The one or more non-transitory computer readable media of claim 12 wherein the application program is selected from the group consisting of: a graphical modeling program, an array-based analysis program, and a browser.

17. A non-transitory computer-readable medium comprising instructions, the program instructions when executed by a processing element configured to:

receive, from an application program operating at a user device, a first command directed to an instrument that responds to instrument commands that conform to an instrument protocol, the first command:
  received at a driver cloud that is remotely located from the user device, evaluated by the application program, and not conforming to the instrument protocol;
select a driver of a plurality of drivers for the instrument, the selected driver implementing the instrument protocol;
use the selected driver, at the driver cloud, to translate the first command into a second command that conforms to the instrument protocol;
receive, at the driver cloud, a response following execution of the second command at the instrument;
following receipt of the response, determine, at the driver cloud, that the response is syntactically correct for the selected instrument driver that is to process the response;
process, at the driver cloud, the response utilizing the selected instrument driver to produce a user response; and
transmit, from the driver cloud to the user device, the user response.

18. The non-transitory computer-readable medium of claim 17 wherein the application program is executing either on the user device, or remotely to the user device.

19. The non-transitory computer-readable medium of claim 17 further comprising instructions executable by the processing element to:

utilize the selected driver to, translate the response into the user response that conforms to a format of the application program.

20. The non-transitory computer-readable medium of claim 19 wherein the response is received from the application program operating on behalf of the user device, or the instrument.

21. The non-transitory computer-readable medium of claim 20 wherein the driver cloud and the instrument are in one sub-network.

22. The non-transitory computer-readable medium of claim 17 further comprising instructions executable by the processing element to:

determine one or more characteristics of the instrument, wherein the driver is selected based on the one or more characteristics of the instrument.

23. The non-transitory computer readable medium of claim 22 wherein the one or more characteristics of the instrument include at least one of:

a type of instrument,
a manufacturer of the instrument,
a model of the instrument,
a revision of software installed on board the instrument,
one or more optional features of the instrument,
one or more user specified characteristics, and
a type of physical connection between the device and the instrument.

24. The non-transitory computer readable medium of claim 17 wherein the driver cloud includes a driver store having a plurality of drivers, and
the driver is selected from the driver store.

25. The non-transitory computer readable medium of claim 24 further comprising instructions executable by the processing element to:

update one or more drivers in the driver store.

26. The non-transitory computer readable medium of claim 17 further comprising instructions executable by the processing element to:

select one or more ancillary programs, wherein
the translate includes translating the first command to conform to the one or more selected ancillary programs.

27. A method comprising:

storing, at a driver cloud that is located remotely from a user device, a plurality of instrument drivers for an instrument that responds to instrument commands that conform to an instrument protocol;
receiving, at the driver cloud from the user device, a first command directed to the instrument, the first command:
  evaluated by an application program, and not conforming to the instrument protocol;
selecting, by the driver cloud, a particular instrument driver from among the plurality of instrument drivers for the instrument, where the particular instrument driver that is selected supports interaction with the instrument according to the instrument protocol;
translating, by the driver cloud, using the particular instrument driver, the first command into one or more of the instrument commands, where the one or more of the instrument commands conform to the instrument protocol;
receiving, at the driver cloud, a response following execution of the one or more of the instrument commands at the instrument;
following receipt of the response, determining, at the driver cloud, that the response is syntactically correct for the particular instrument driver that is to process the response;
processing, at the driver cloud, the response utilizing the particular instrument driver to produce a user response; and
transmitting, from the driver cloud to the user device, the user response.

28. The method of claim 27 further comprising:

maintaining, at the driver cloud, state information for a session with the instrument.

* * * * *